United States Patent [19]

Ackeret

[11] 4,241,528
[45] Dec. 30, 1980

[54] PICTURE VIEWER
[75] Inventor: Peter Ackeret, Küsnacht, Switzerland
[73] Assignee: Licinvest AG, Chur, Switzerland
[21] Appl. No.: 943,369
[22] Filed: Sep. 18, 1978
[30] Foreign Application Priority Data
Sep. 20, 1977 [DE] Fed. Rep. of Germany ....... 2742350
[51] Int. Cl.³ ............................................. G09F 11/30
[52] U.S. Cl. ........................................ 40/513; 40/490; 40/511
[58] Field of Search ................. 40/513, 511, 509, 508, 40/490, 380, 375, 381

[56] References Cited
U.S. PATENT DOCUMENTS

| | | |
|---|---|---|
| 3,377,727 | 4/1968 | Weggeland ............................ 40/511 |
| 3,495,345 | 2/1970 | Weggeland ............................ 40/490 |
| 3,783,540 | 1/1974 | Barclay ................................. 40/511 |
| 4,057,920 | 11/1977 | Weggeland ............................ 40/513 |

Primary Examiner—John F. Pitrelli
Attorney, Agent, or Firm—H. Dale Palmatier

[57] ABSTRACT

A picture viewer having a housing to contain a pile of pictures, a slide in the housing, a window in the housing, a pressure plate confronting the window, springs mounting the plate, in certain embodiments biased to press the plate toward the window, and in other embodiments biased to retain the plate away from the window, a control to alternately move the plate against the spring bias or release the plate to alternately apply and relieve pressure on the pile of pictures, the control operating in response to withdrawal and return of the slider and also being manually operable.

21 Claims, 52 Drawing Figures

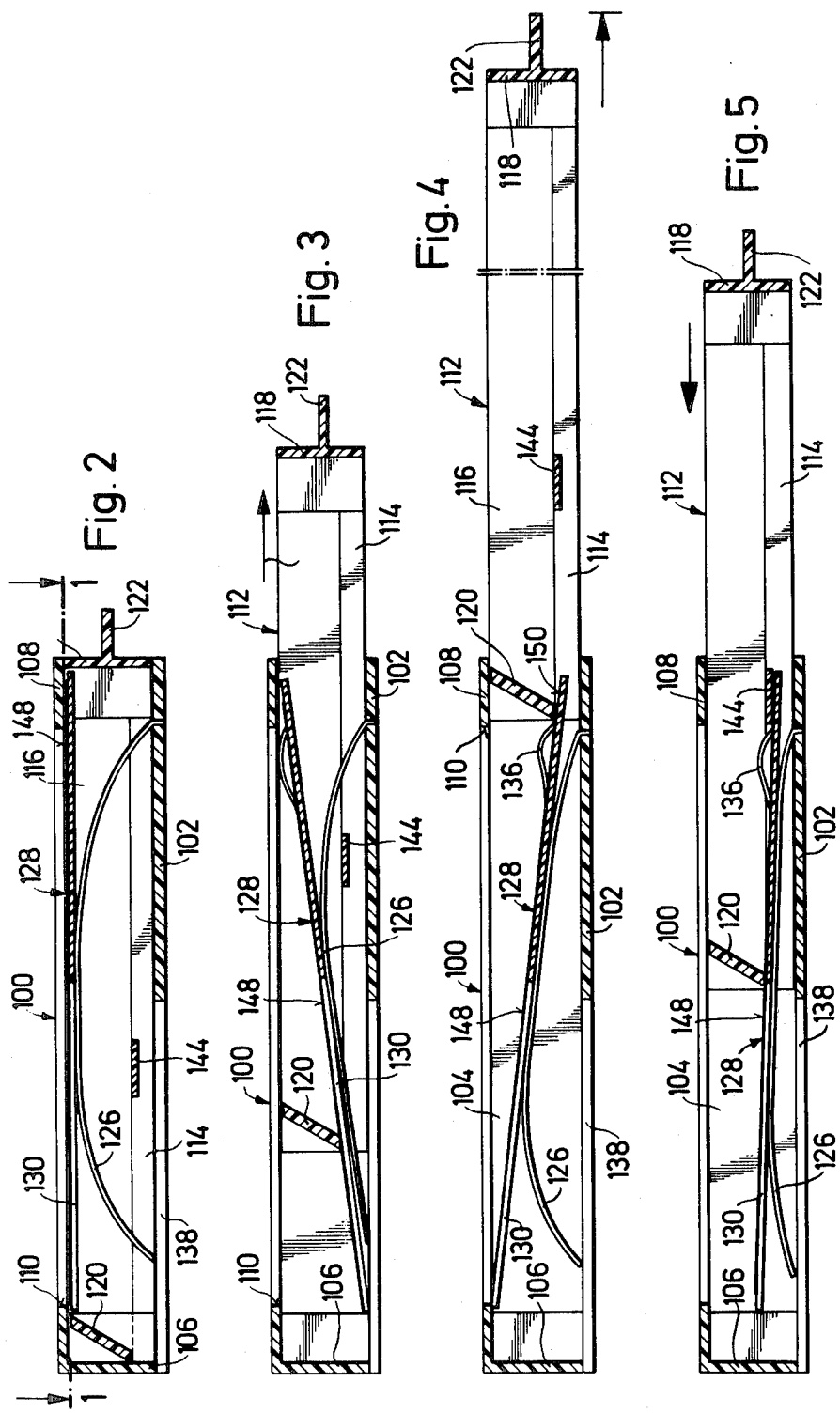

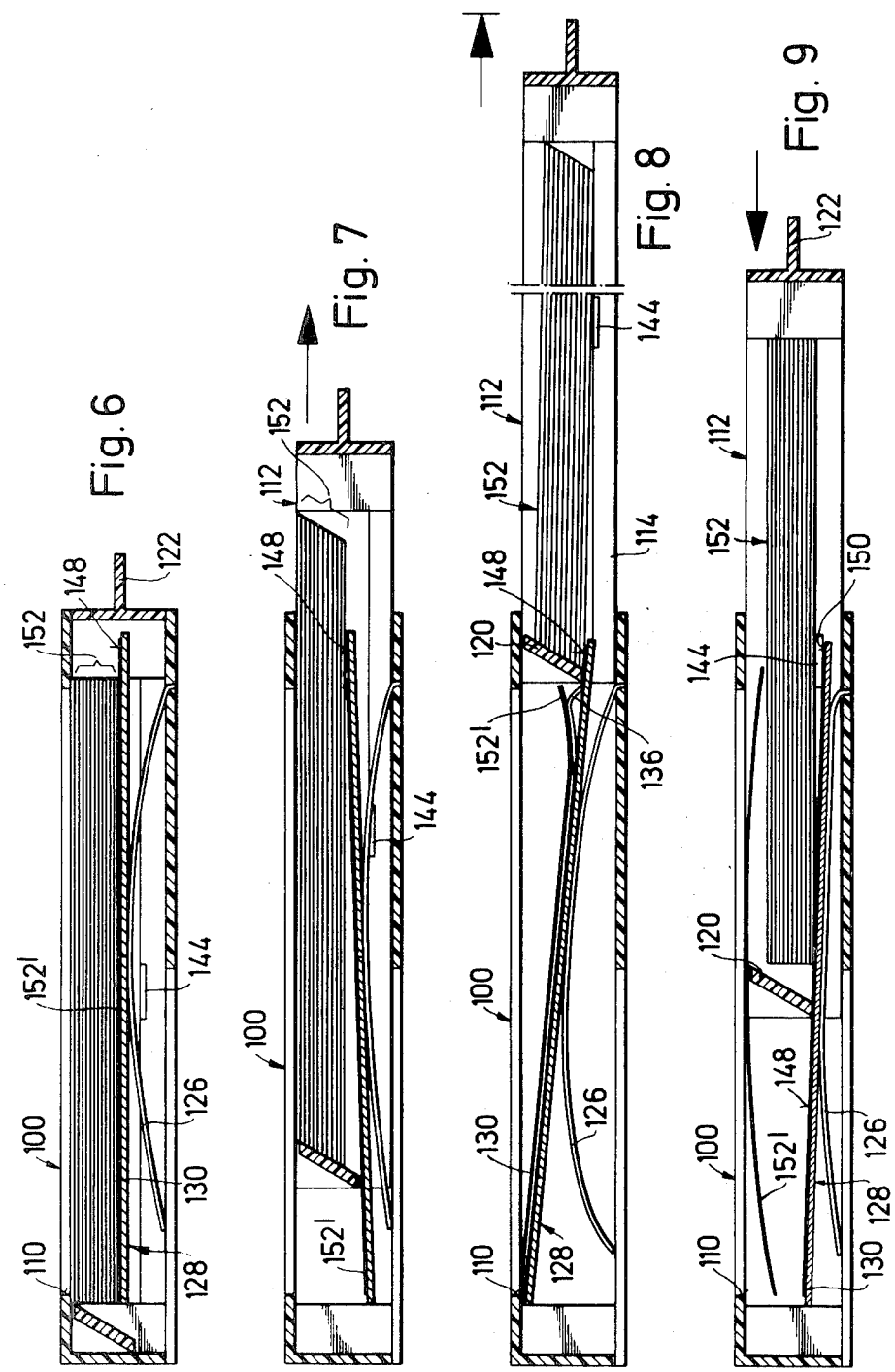

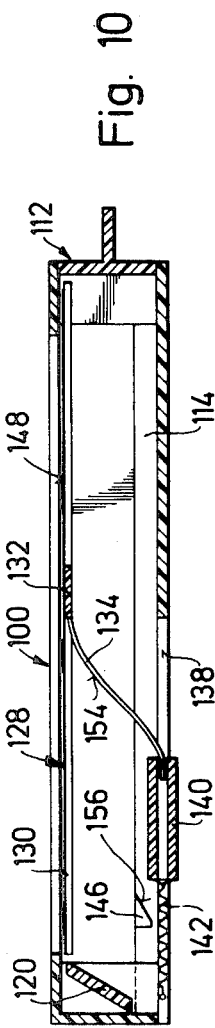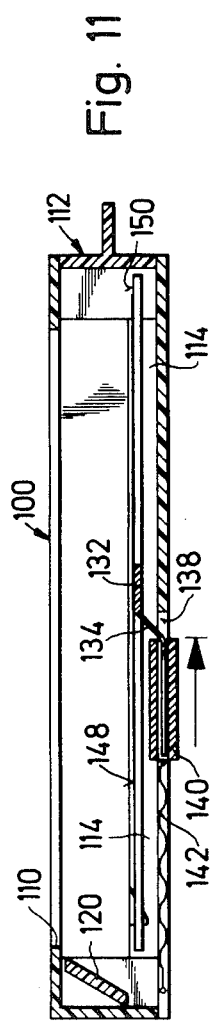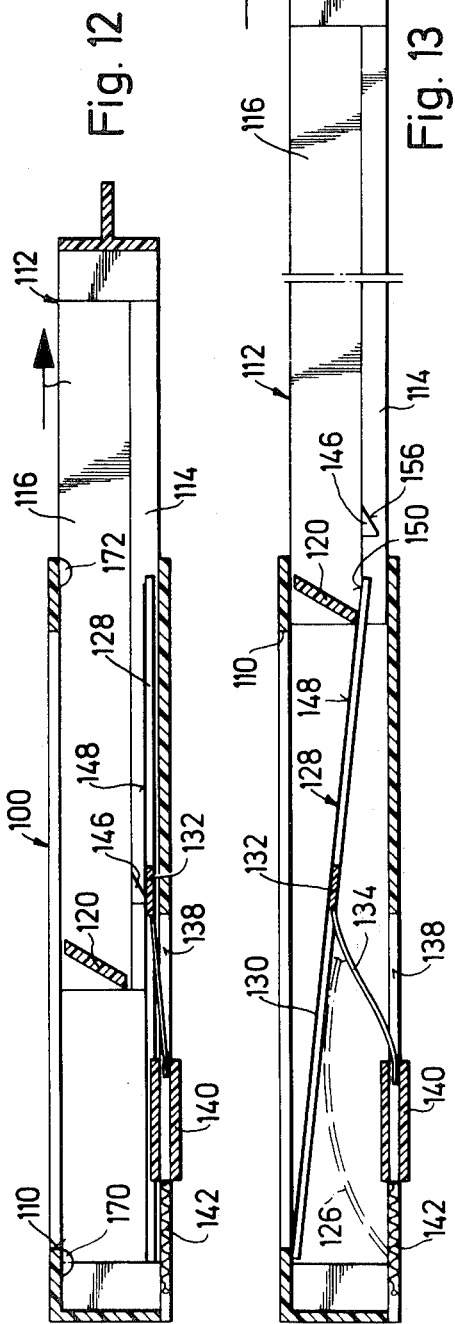

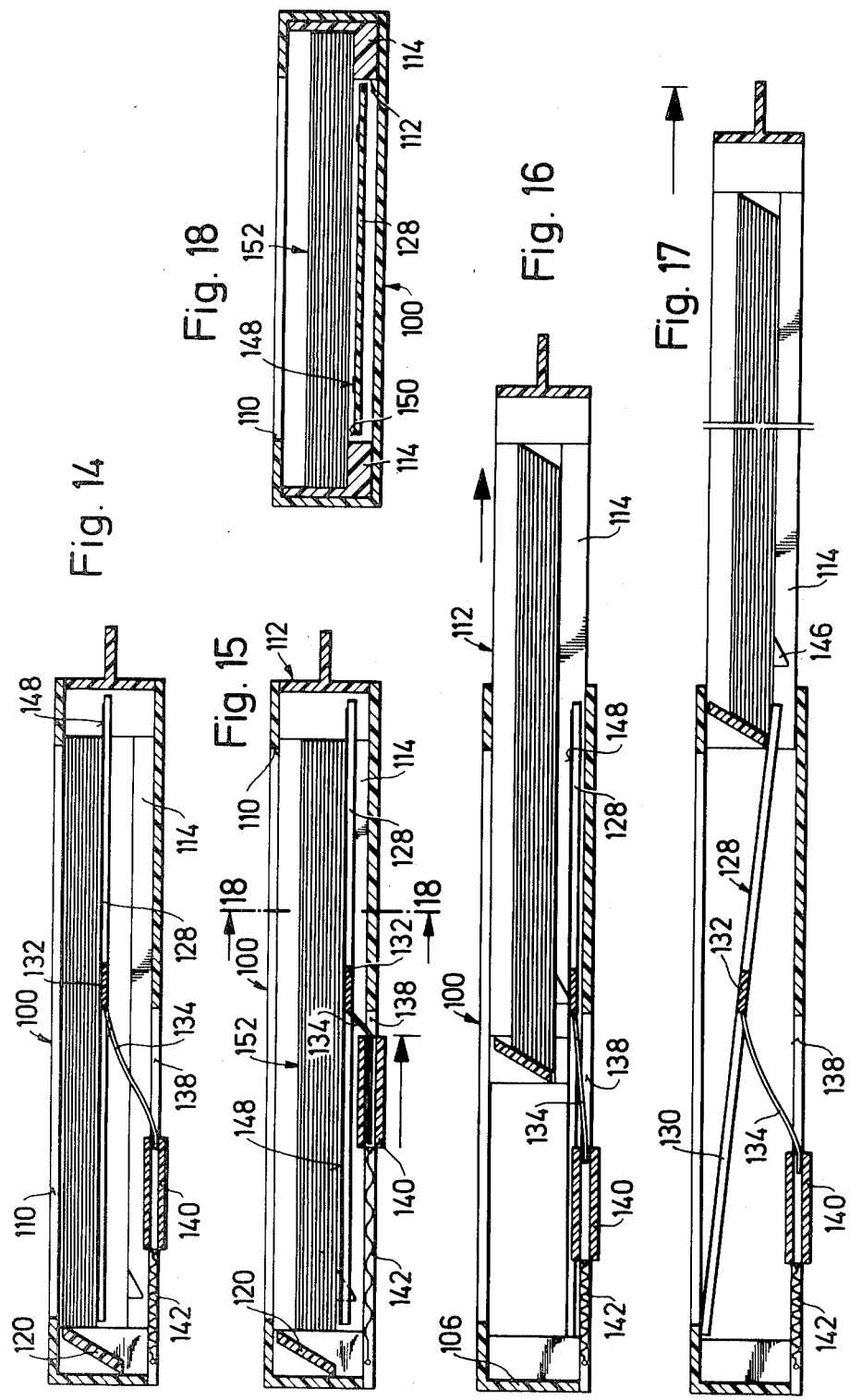

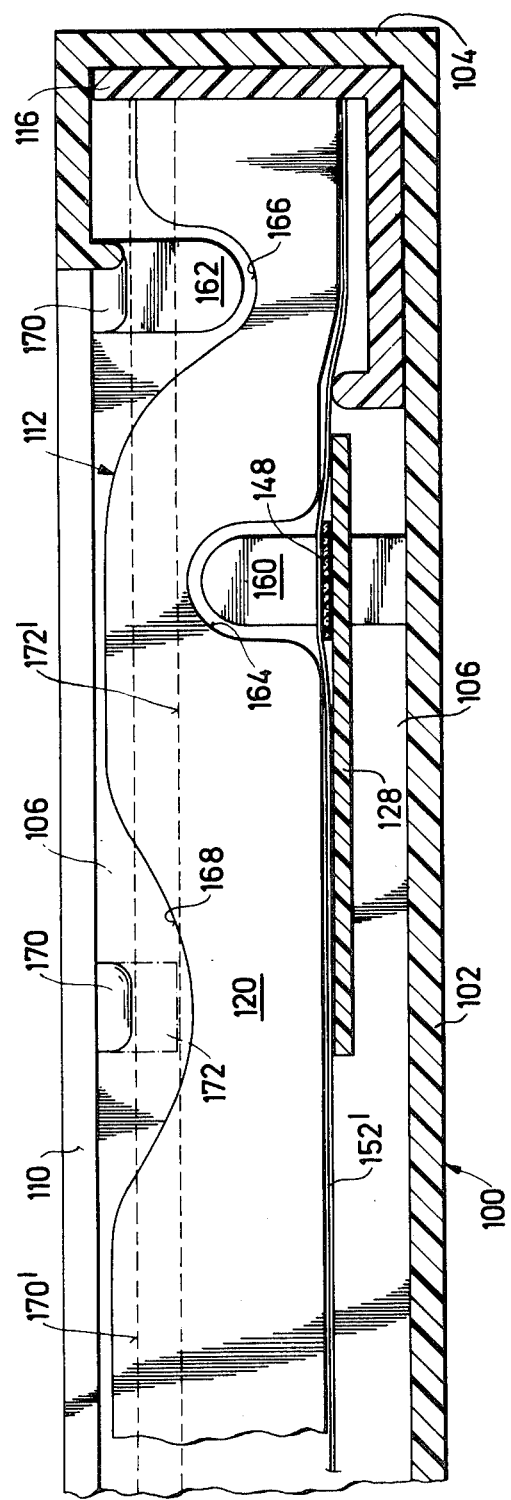

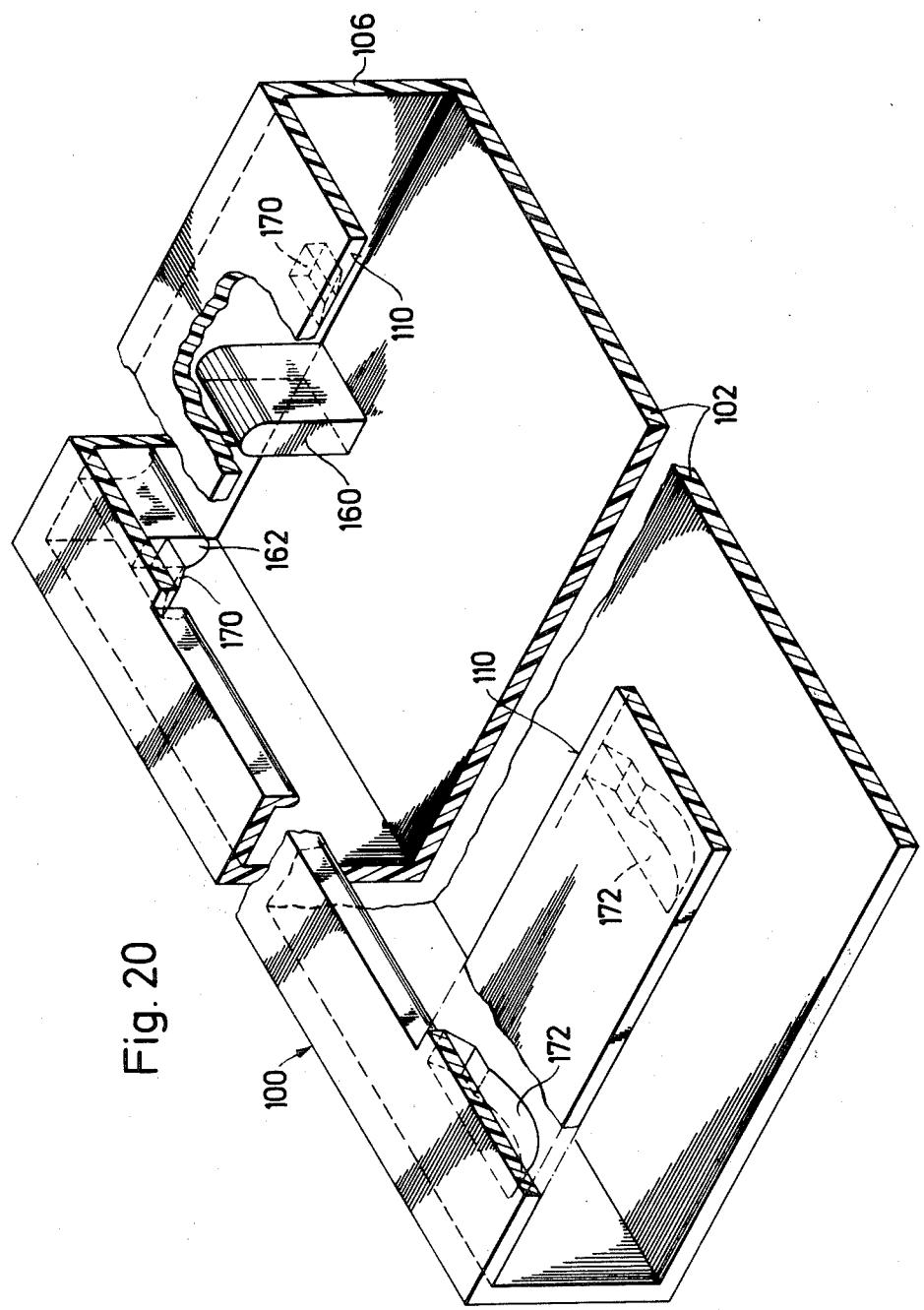

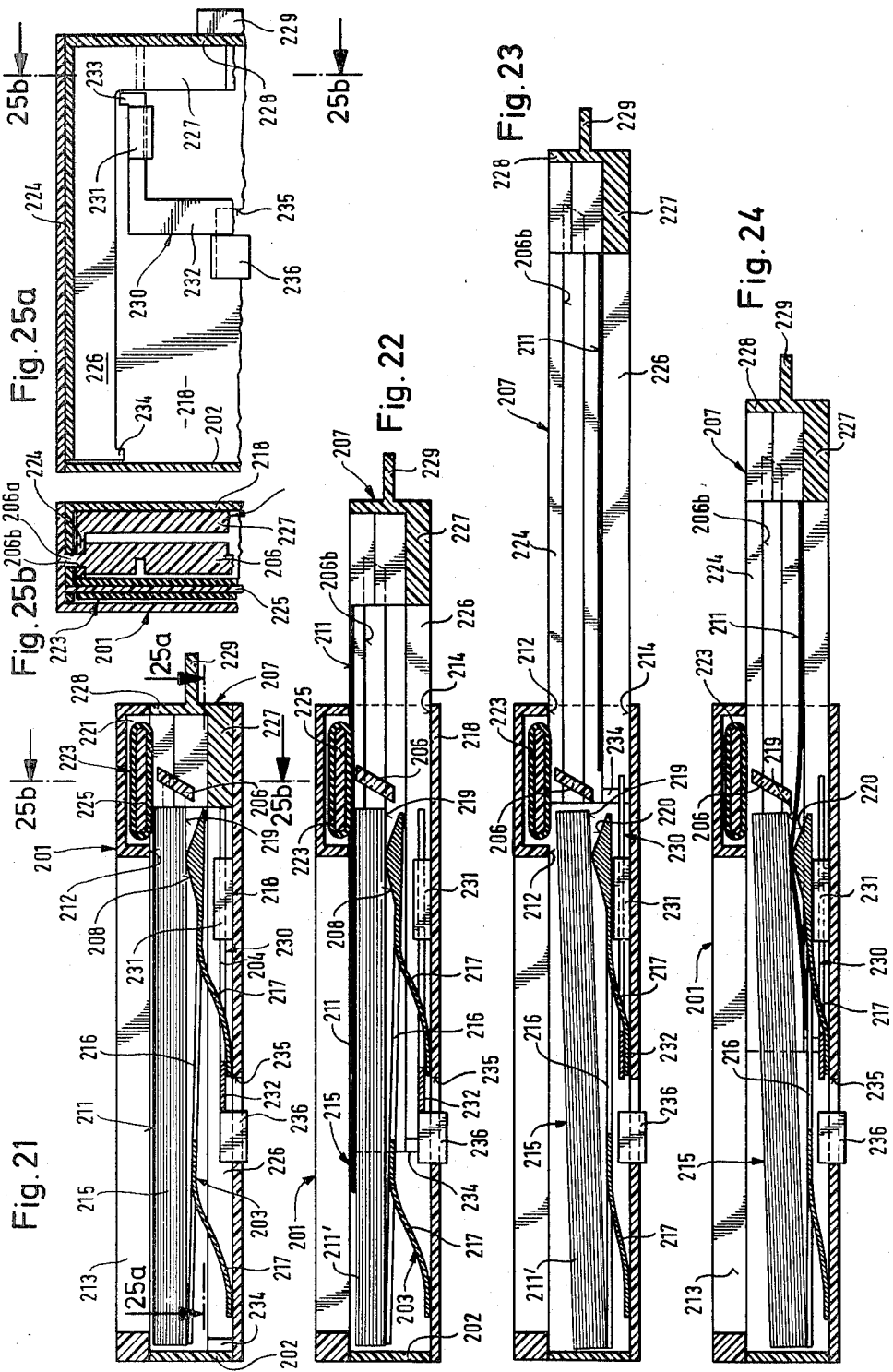

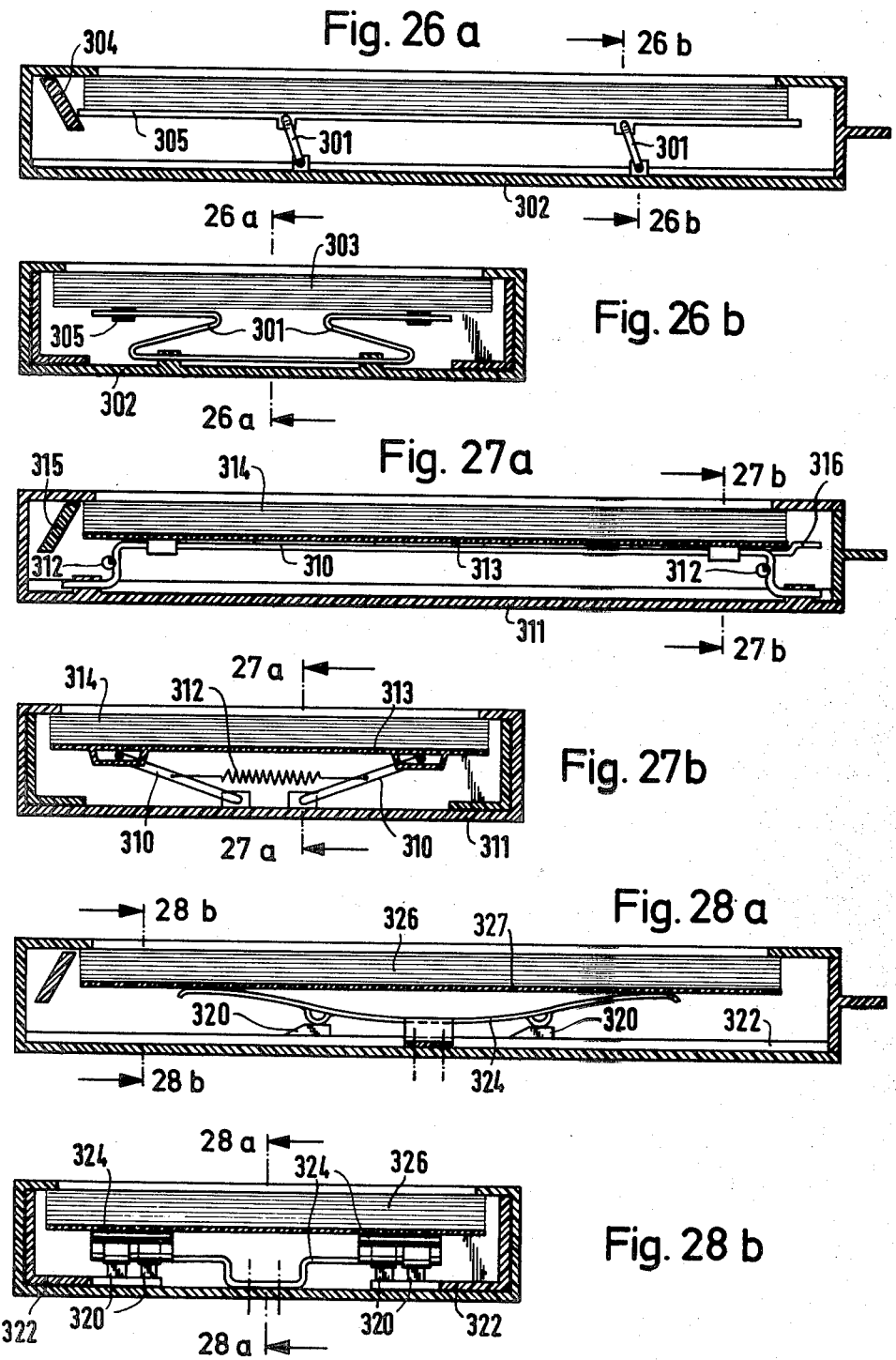

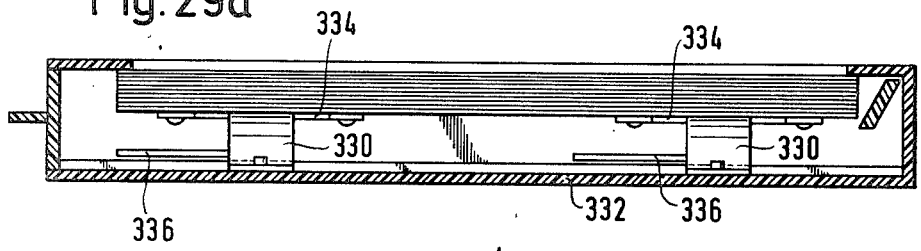
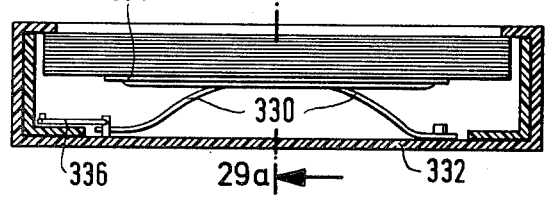
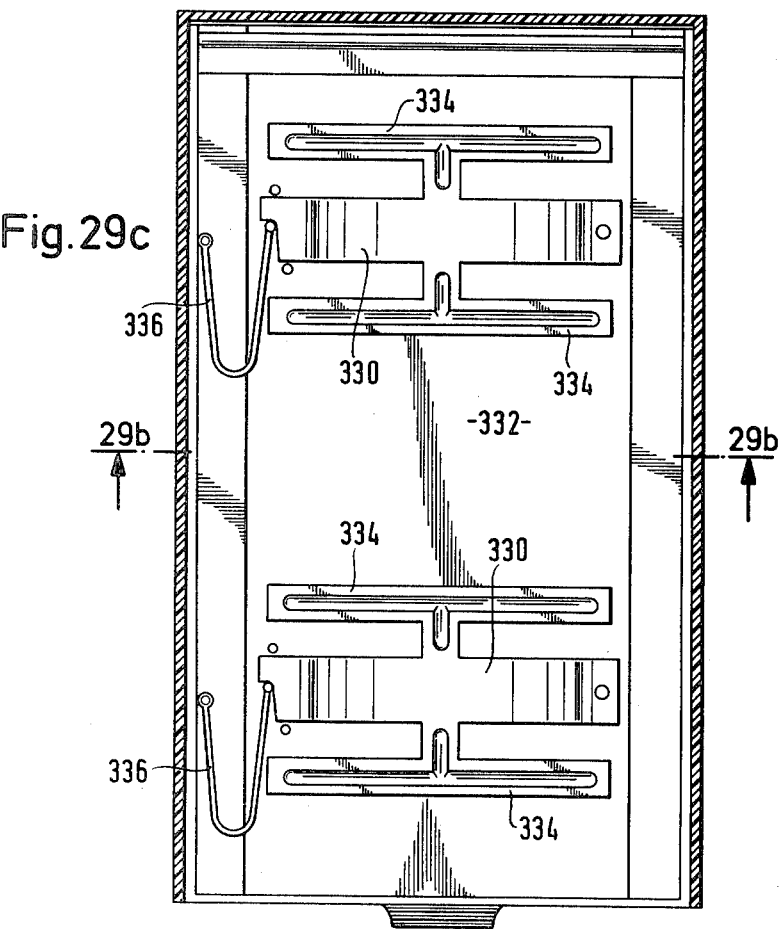

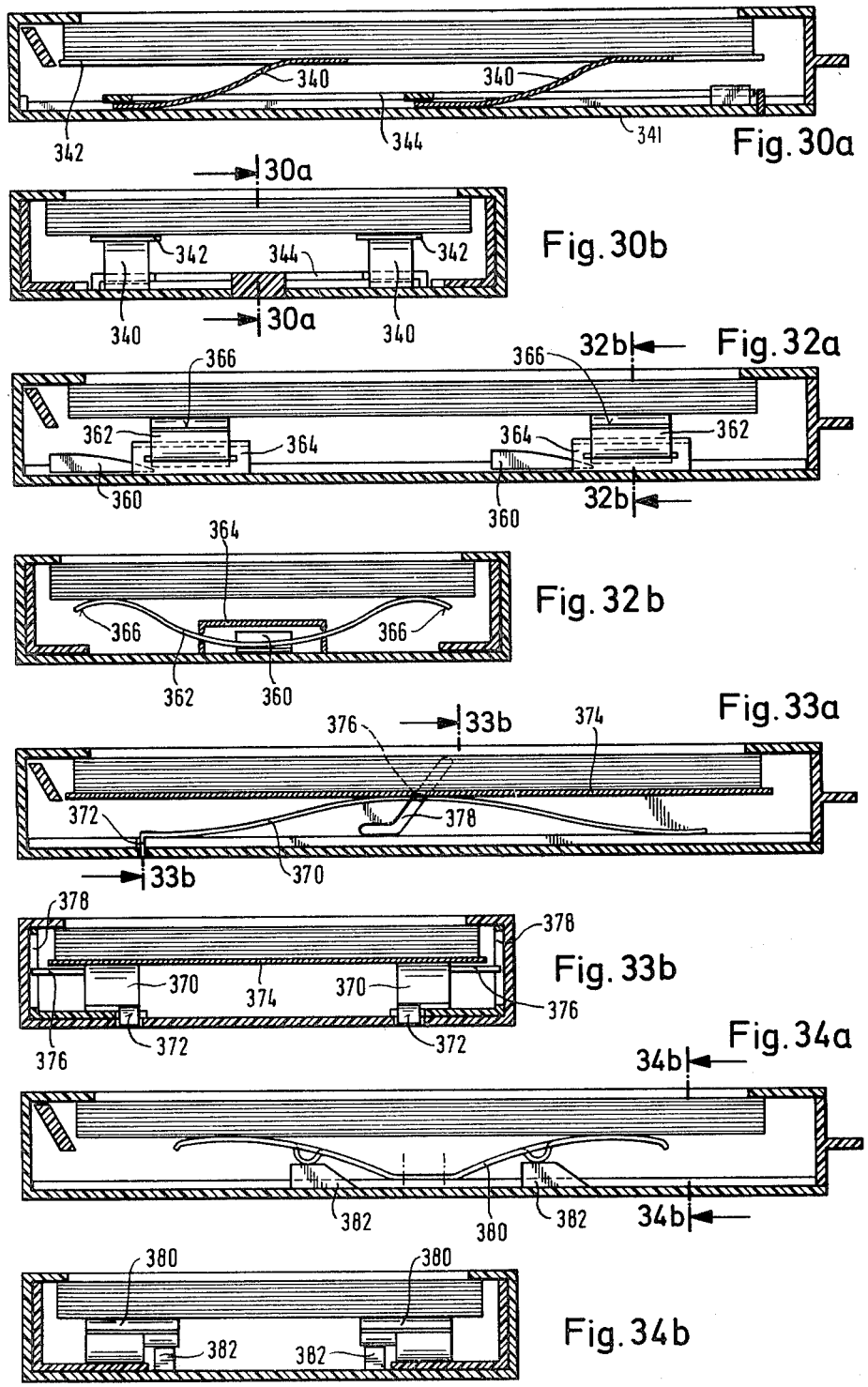

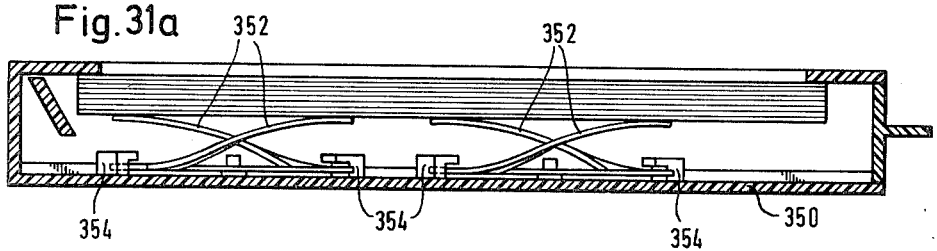
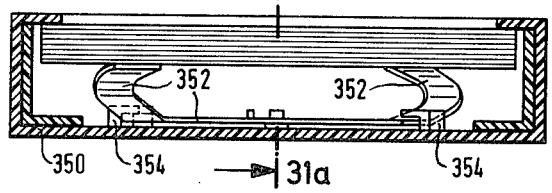
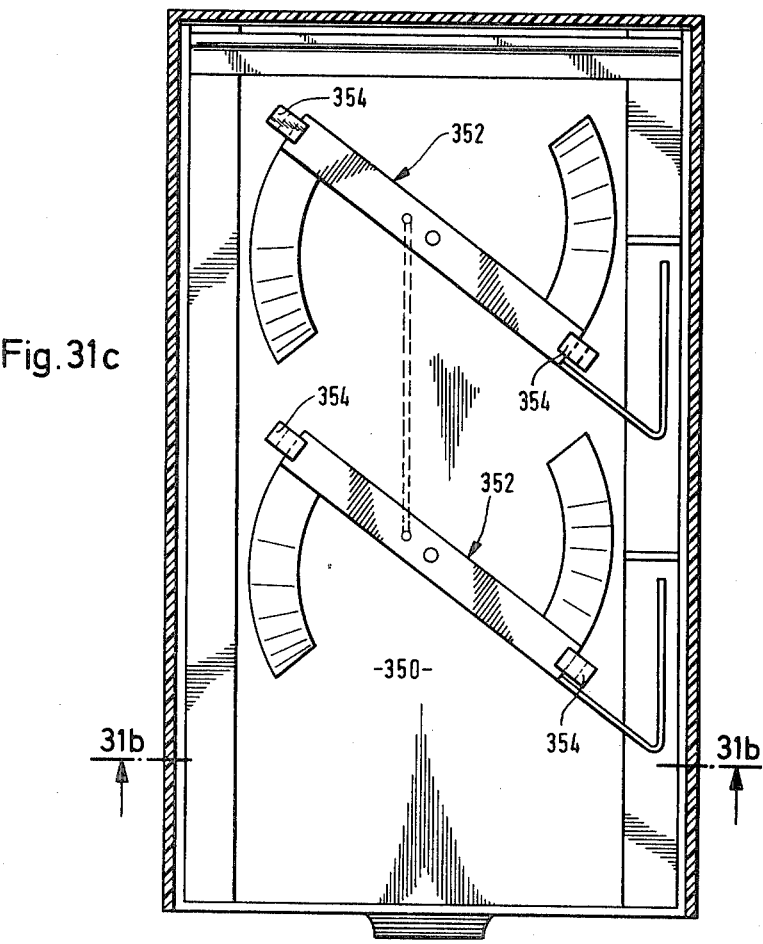

PICTURE VIEWER

The invention relates to a picture viewer having a picture change mechanism.

BACKGROUND OF THE INVENTION

Such devices have been known in the past. See German patent Specification No. 179,675, German Patent Specification No. 224,700, German Patent Specification No. 873,908. They are all based on the following principle:

In a shallow housing having a viewing window that is covered, if desired, by a transparent plate, there is a pile of pictures, the uppermost one of which is exposed to view through the viewing window and is supported at its edges. A pressure arrangement using a spring holds the pile pressed upwards against the window or the frame thereof. Laterally, the housing has an aperture through which a slider member may be pulled out; the withdrawal movement of the slider member is limited by stops. Near to the housing aperture there is arranged a member referred to here and hereinafter as a separator which covers this aperture transversely and at the top and the bottom leaves clear a narrow slot for a picture to pass through. As the slider member is pulled out, the uppermost picture is pulled by a hook-like transporter through the top slot, wherein the remainder of the pile is supported against the separator and during the return stroke of the slider member the picture is pushed through the bottom slot and under the pile again, or more accurately, between the pressure arrangement and the bottom-most picture of the pile. The second uppermost picture now lies in front of the viewing window and the procedure can be repeated as often as desired.

The spring pressure arrangement serves not only to position the uppermost picture against the viewing aperture; a comparatively low force would be sufficient for that. It must also, however, see that the hook-like transporter engages properly even when the pictures of the piles are deformed, spoiled and arched. The forces to be applied are therefore considerable.

This makes the change-over mechanism not only awkward but also results in a stress on the pictures which for photographs, or example, is inadmissible. The uppermost picture is clamped between the window or the window frame and the second uppermost picture and slides on both as the pressure arrangement is pulled out, and the picture is likewise subjected to considerable sliding friction when reinserted. Furthermore, the picture is crushed end on and thus compressed in the longitudinal direction which is troublesome, particularly during the reinsertion procedure, as the picture is not supported by the pile.

SUMMARY OF THE INVENTION

According to this invention, although the pressure arrangement will always be effective during the picture viewing, during the critical stages of the picture change it is disabled and thus the damage to the surface of the picture caused by friction, especially when dust is present, is correspondingly reduced; the crushing of the pictures can likewise be reduced to a minimum. The awkwardness is avoided.

The pressure arrangement can be disabled for the duration of the entire slider member movement, with the exception of the end position thereof, but as a general rule it is sufficient for the disabling to be effected only during the return stroke. Provision is made for this last variation whenever the change-over operation necessitates the pressure arrangement being operative during a large part of the withdrawal movement of the slider member.

It is especially advantageous when the disabling device can be used at least partially to disable the pressure arrangement selectively from the outside, regardless of the change-over operation, for instance for the dispatch of still damp, sensitive pictures (photographic prints), for storage purposes and for changing the complete pile. With one manipulation the function can be changed from that of a change-over picture viewer to a storage arrangement which operates without pressure.

The device may be provided with further modifications alternatively or in combination, in order to improve its use.

These modifications include pliable support at the back face, means to hang the device as a frame, interchangeable additional frames to be fastened by some means at the front face and having different shapes and surface treatments, the biasing of the slider by means of a spring into its fully opened or fully closed position, the division of the housing wall comprising the window into a multiplicity of windows each one related to a pile of pictures, and another one to a pile of text cards, picture and text eventually being disposed on a common information carrier. Further, the window wall of the housing may be provided with space to permit a user to make notes thereon.

Further, there is the possibility to provide a space within the device, preferably stationary within the housing, to store, e.g., the negative belonging to the photo negative disposed in the slider. Finally, the device may be provided at its front and on its rear face with a window each in which case, of course, two different sliders are mounted in parallel.

The following text describes examples of embodiments, one construction of which will be discussed in detail, in which provision is made for a spring pressure arrangement disposed in the housing to be disabled only during the return stroke of the slider member. Schematically illustrated Examples of constructions restricted substantially to those elements essential to the comprehension then follow, in which the pressure arrangement is disabled also during the withdrawal of the slider member and/or in which the spring pressure arrangement is accommodated in the slider member.

BRIEF DESCRIPTION OF DRAWINGS

FIGS. 6–9 are longitudinal section views similar to FIGS. 2-5, but with piles of pictures illustrated, FIGS. 10–13 are longitudinal section views of the device of FIG. 1, but on a plane approximately midway between the sides thereof and showing the device in different phases of operation, FIGS. 14–17 are longitudinal section views similar to FIGS. 10–13, but including piles of pictures shown somewhat diagrammatically, FIG. 18 is a transverse section view taken approximately at 18—18 in FIG. 15, FIG. 19 is an enlarged detail transverse section view through the device, FIG. 20 is a detail perspective view of the housing with portions broken away for clarity of detail, FIGS. 21–24 are longitudinal section views of a modified form of the picture viewer and showing the viewer in different phases of operation, FIG. 25a is a detail horizontal section view taken approximately at 25a—25a of FIG. 21, FIGS. 26a and 26b, and FIGS. 27a and 27b, and FIGS. 28a and 28b, and FIGS. 29a and 29b and 29c illustrate a number of different modified forms of the invention and more specifically, FIG. 26a is viewed at 26a—26a of FIG. 26b; FIG. 26b is taken at 26b—26b of FIG. 26a; FIG. 27a is taken at 27a—27a of FIG. 27b; FIG. 27b is taken at 27b—27b of FIG. 27a; FIG. 28a is taken 28a—28a of FIG. 28b; FIG. 28b is taken at 28b—28b of FIG. 28a; FIG. 29a is taken at 29a—29a of FIG. 29b; FIG. 29b is taken 29b—29b of FIG. 29c.

Additional modified forms of the invention are illustrated in FIGS. 30a and 30b; FIGS. 31a, 31b and 31c; FIGS. 32a and 32b; FIGS. 33a and 33b; FIGS. 34a and 34b; and more specifically, FIG. 30a is a somewhat diagrammatic longitudinal section taken at 30a—30a of FIG. 30b, FIG. 31a is a somewhat diagrammatic longitudinal section view taken at 31a—31a of FIG. 31b, FIG. 31b is a somewhat diagrammatic section view taken at 31b—31b of FIG. 31c, FIG. 32b is a transverse somewhat diagrammatic section view taken at 32b—32b of FIG. 32a, FIG. 33b is a somewhat diagrammatic transverse section view taken at 33b—33b of longitudinal section view 33a, and FIG. 34b is a transverse section view taken at 34b—34b of longitudinal section view 34a.

FIG. 35 is a detail section view through the housing of the modified form; FIG. 36 is a top plan view as viewed at the arrow 36 in FIG. 35; FIG. 37 and FIG. 38 are perspective views of the viewer residing in two different positions.

DETAILED SPECIFICATION

Figure 1:
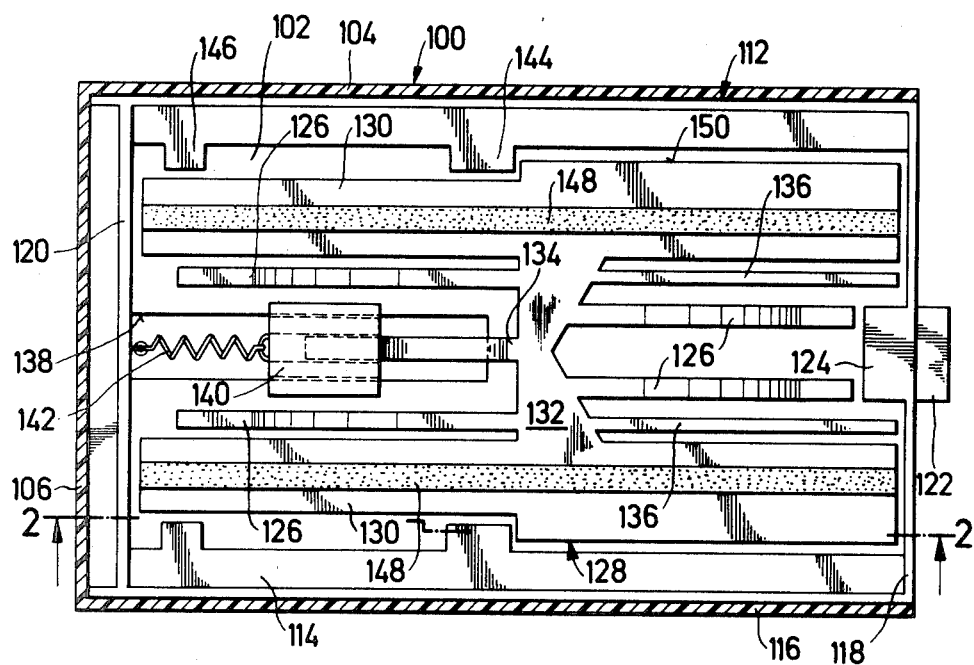
FIG. 1 is a somewhat diagrammatic horizontal section view taken at 1—1 in FIG. 2, FIGS. 2–5 are longitudinal section views taken approximately at 2—2 in FIG. 1 and respectively showing different phases of the operation of the device.

FIGS. 1 to 20 relate to a first example of an embodiment.

The housing or frame 100 comprises a base plate 102, side walls 104, a back wall 106 and a lid 108 having a window 110. The slider member 112 movably guided on the housing or frame 100 to permit relative reciprocation of the frame and slider including relative obverse and reverse sliding movements in opposite directions and between stops which are constructed in the side walls 104, the slider consists of base bars 114, side bars 116, on front bar 118 and a separator bar or pile transporter 120. A pull 122 for pulling and pushing is shaped on the front bar and a holding-down lug 124, likewise shaped on the front bar, may be recognized.

In the housing there is a pair of springs 126 biased by arching upwards, one end of each of the springs being anchored in the housing base plate 102 while the other end of each spring is able to execute a restricted sliding movement along the base plate. The springs 126 press against the main limb 130 of a pressure plate 128 and urge this upwards; as indicated in FIG. 1, the springs 126 are integral with the pressure plate and the arms of the springs 126 facing the back wall 106 are spaced further apart than the arms facing the front bar 118 of the slider member.

The two main limbs 130 of the pressure plate 128 are joined together by a cross member 132 on which a central limb 134 is shaped. Finally, auxiliary limbs 136 extend additionally from the cross member 132. The function of these elements will be explained in detail later.

In the base plate 102 there is formed a guide 138 parallel to the direction of movement of the slider member, in which guide a button or disabling control 140 may be moved in a sliding manner. The button 140 is pulled towards the back wall 106 as far as a stop (not shown) by means of a restoring spring 142 and has a central hole into which the central limb 134 of the pressure plate projects in a sliding manner.

Control abutments 144 and 146 are shaped on the lateral bars of the slider member and their function will also be explained later.

On the main limbs 130 of the pressure plate 128 there are individual picture transporters or strips 148 attached, as by glue. The retentive strips 148 are of rubber or a commercially available plastics material which with only a slight contact pressure exerts an unusually high retentive or adhesive force.

As will be realized, the pressure plate is intended to hold fast the bottom-most picture of the pile as the slider member is pulled out, while the separator bar takes with it the other pictures. When the slider member is returned, however, the effect of the upward application of pressure by the plate must be considerably reduced. The sequence of operation will be explained first of all with reference of FIGS. 2–5, without the pile inserted.

FIG. 2 shows the initial state. The pressure plate lies under the influence of the springs 126 against the window 110 and the lid 108; the separator bar 120 is located between the pressure plate and the back wall 106. If the slider member 112 is now pulled, then the inclined face of the separator bar presses on the edges of the main limbs 130 that are facing it and these move downwards, as the springs 126 yield. The other end edges of the main limbs are, however, as before, pressed upwards. The control abutment 144 thus does not strike the control edge 150 of the main limb 130, which takes the form of a lateral extension thereof, because it slides away beneath the abutment 144. In the end position of the slider member (FIG. 4) the separator bar 120 is pressing the front edges of the main limbs 130 downwards, and because of a "rocking movement" the rearmost edges of the same are correspondingly raised. If the slider member is now pushed in again, then the separator bar presses the pressure plate further down again, but the lowest position of the plate is now near to the front edges, that is to say, nearest the slider member. Therefore, the control abutments 144 now engage over the control edges 150 of the pressure plate and hold this down until the slider member has returned almost to its initial position again where the control elements disengage again and the pressure plate moves rapidly upwards again (cf. FIGS. 1 and 5).

The actual picture change sequence proceeds as follows (FIGS. 6 to 9): To begin with the pressure plate is loaded with a pile 152 of, for example, twenty pictures and therefore lies lower down than illustrated in FIG. 2. As the slider member is pulled out, the separator bar takes with it all the pictures of the pile, since the separator bar "sweeps" over the pressure plate. The bottom-most picture 152' however, against which the retentive covering 148 on the main limbs 130 directly presses from below, is held fast by the retentive covering and remains lying on the pressure plate 128. For the rest, the procedure takes place as described above with reference to FIG. 3. Finally, the slider member reaches its end position shown in FIG. 8, in which the pictures 152 fall at the front onto the base bars 114 of the slider member while still lying with their rear edges on the pressure plate. As soon as the separator bar 120 has slid over the ends of the auxiliary limbs 136 that are slightly biassed in an upward direction, the picture 152' that has remained behind is pressed upwards a little by these ends at this (front) edge, so that when the slider member is re-inserted the rear face of the separator bar 120 pushes between the pressure plate and this picture 152' and raises the picture sufficiently far for it to be brought upwards over the upper edge of the separator bar. On further movement of the slider member its separator bar therefore slides below the picture 152' that positions itself in the final position as the uppermost picture on the pile 152. The insertion of the pile is thereby not hindered by the retentive covering 148 since, as mentioned above, the pressure plate is held down by the control elements 144, 150.

If the entire pile is to be removed, then the button 140 is displaced towards the front. As apparent from FIGS. 10 to 13, the central limb 134 of the pressure plate is downwardly curved so that an S-shape, which is straight when viewed from above, is produced, the lower end of which projects into the button. If the button is displaced out of the position shown in FIG. 10 into the position shown in FIG. 11, then it presses on the upper inclined face 154 of the central limb 134 and pulls the complete pressure plate 128 down against the force of the springs 126, and in fact pulls down until the upper side of the retentive covering 148 is lower than the surface of the base bar 114 of the slider member 112. Thus, when the slider member is pulled out, the entire pile 152 is taken with it, as the pile now lies on the slider member itself. As a result of the biassing of the springs 126 and the friction contact of the central limb 134 in the button 140, the button is not pulled back by the spring 142 which is weak in comparison. However, when the control abutment 146 strikes with its sloping control face 156 on the control edge 150, the pressure plate is pressed down even further and in this manner terminates the clamping between the button 140 and the central limb 134 so that the button is pulled by the spring 142 into its rest position (FIG. 12). Nevertheless, the control abutment 146 holds the pressure plate below the level of the base bars of the slider member so that the pile can be pulled out unimpeded to its full extent. Near to the end of the path of movement the control abutment 146 releases the control edge 150 again; the springs 126 are able to press the pressure plate upwards again at its rear edge whilst at the front it is still held down by the separator 120.

From the above explanations the sequence can be followed again with reference to FIGS. 14 to 17 when a complete pile is to be removed; the positions of the slider member according to FIGS. 14 to 17 are analogous to those of FIGS. 10 to 13.

FIG. 18 shows once again the relative positions of the base bars 114 on the one hand, and the pressure plate 128 on the other hand when the button is in the removal position.

In principle, it would also be possible to return the button into the rest position by means of a control member (not shown) simply during the return of the slider member. However, it may be seen that in the embodiment illustrated there is the advantage that by holding the button firmly in the removal position, the device can be held permanently ready for the removal operation, for example in a storage position of the device in a frame or for transporting sensitive pictures.

Figure 19A:
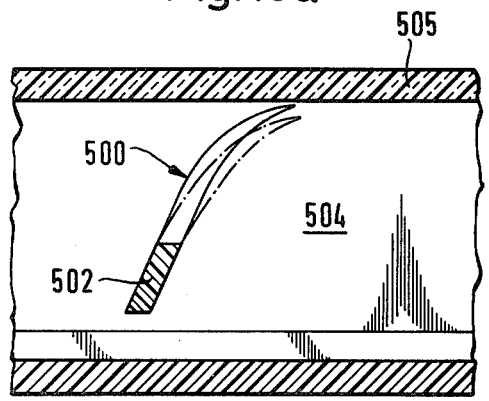
FIGS. 19a and 19b are enlarged detail section views of modified forms of the separator carried on the slider member.
Figure 19B:
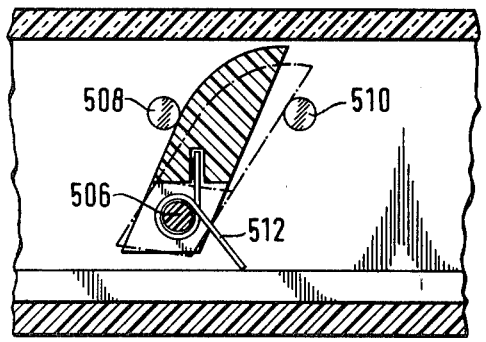
Figure 35:
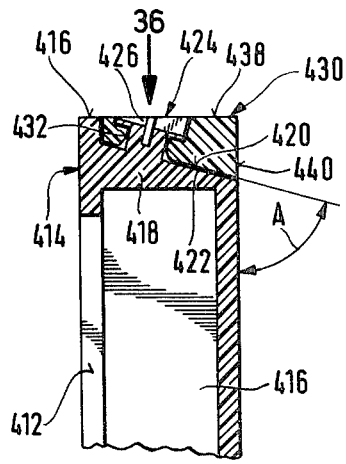
FIGS. 35–38 illustrate another modified form of the invention and more particularly.

Instead of the relatively complicated design with hold-down cams, the forms of embodiments shown in FIGS. 19a and 19b can be selected. In FIG. 19a the separator itself is designed to be flexible such that it is secured laterally in the slider member 504 only in the area 502 near to its lower edge, but at the top is only a short distance away from the viewing window 505. When the slider member is pulled out the distance between the separator and the viewing window is so small that the uppermost picture is sure to be carried along. During the return stroke, however, the separator is able to bend downwards, as indicated by a dot-dash line, and allow the picture to pass through.

Alternatively, as shown in FIG. 19b a separator pivotable about a pin 506 against the spring pressure of the spring 512 may be provided wherein the separator lies against the stop 508 as the slider member is pulled out but, during the return stroke of the slider member, is pivoted towards the stop 510 by the picture sliding over the separator, and then returns to its initial position under the pressure of the spring 512.

The operations that are effected by the pressure plate will now be summarised once again.

During picture change-over, the pressure plate is always held straight with the "line" (transversely to the movement of the slider member) adjacent to the bottom-most picture, where the separator runs over. The picture to be retained is consequently clamped reliably where necessary. During the return of the slider member on the other hand the control elements 144 to 150 hold the pressure plate below the level of the base bars of the slider member (or other support means, e.g. on the base plate of the housing) so that the retentive covering 148 does not touch the underside of the pictures.

During the change-over of the pile the pressure plate is brought into the same position as during the change-over return stroke but by means of a button that can be actuated separately. This can be held permanently in the position in which the pile can be changed, but springs back automatically without further manipulation into picture change-over position. It will be seen that in this manner the device is fool-proof.

The pressure plate is so constructed that it also reliably holds fast badly curved pictures and permits the change-over and removal procedure to take place. In order to deal with such "bent" pictures, however, a series of further features is provided in order to prevent incorrect operation.

Pictures that are curved downwards about the transverse axis—at right angles to the direction of movement of the slider member—could lead during the picture change to the top-most or a few of the upper pictures not being pushed back by the end wall 118 of the slider member but being jammed between the end wall of the slider member and the lid of the housing. For this reason the holding-down lug 124 is provided, beneath which the pictures can be snapped as they are inserted; further possibilities are discussed below.

Pictures that are curved in a reverse direction would not be able to allow the passage of the separator during the change-over process, but would push against this. In this case an especially low-friction material may be used for the separator, and instead of manufacturing the complete slider member in one piece is an injection-moulding process, the separator can be attached as a separate part. This is illustrated in FIG. 28.

Pictures that arch downwards about the longitudinal axis could admittedly lie laterally on the base bars of the slider member during the return stroke of the slider member and in this way remain clear of the retentive covering of the pressure plate, but would push centrally onto the facing edge of the central limbs 132 of the pressure plate. For this reason the relevant edge interrupted by the springs 126 and the auxiliary members 136 is designed to converge to a point, as apparent from FIG. 1. A reverse arching of the pictures would not lead to any disruptions.

Although the pictures must, of course, lie freely in the slider member, disruptions might occur if the pictures were to lie crookedly. For this reason stop projections 160 and 162 which project from below and from above, respectively, are shaped on the back wall 106 and project to such an extent that they extend into recesses 164 and 166 of the separator 120 when this is in its inner end position (FIG. 19). In this position one projection 160 in each case near to the lateral walls of the housing projects downwards from the lid thereof towards the interior and further inside a projection 162 projects upwards from the base plate towards the interior. In the direction in which the slider member is pulled out the projection is aligned with one of the retentive coverings 148, with the result that the corresponding recess 166 of the separator itself ensures that the separator cannot touch the retentive coverings. A further recess 168, which is formed in the slider member from above, leaves room for the passage of holding-down cams 170 which project downwards from the lid and may be more clearly seen in FIG. 20, whilst they have been omitted from the other Figures in order to keep these clear. Their function is to press down the uppermost picture so far below the upper edge of the separator when the slider member has been inserted, as to make certain that the slider member takes with it the uppermost picture. Similar holding-down cams that extend further down and are likewise indicated best in FIG. 20 are located near to the front edge of the lid; they have the function of pressing the pile pulled out during the change-over so far below the level of the lower side of the picture 152′ lying on the pressure plate that the sliding movement of the picture 152′ over the separator is effected as far as possible without any hindrance. In FIG. 19, the upper sides of the pictures are indicated below the cams 170 and 172 by broken lines 170′ and 172′.

Finally, it is also apparent from FIG. 19, in which, however, this effect has been considerably exaggerated, how the picture held fast on the retentive coverings 148 is stressed by the separator 120 and thereby held so that it clings reliably.

The exact profile of the separator in the transverse direction depends on the type of pictures to be formed into a pile, on the choice of material and other components. A compromise must be made here between the space requirement occasioned by the necessarily inclined attitude of the separator, along which the pressure plate edge must slide at the slider member end, and the firmly held picture must slide at the other end, and an optimum inclination for these faces. For fairly smooth plastics material an angle of about 45° to 60° has proved successful, although this angle need not be constant, as indicated only schematically in FIGS. 2 to 17, but may also vary along the inclined faces or may be different from one face to the other.

The above-described embodiment had the separator arranged on the slider member and the transporter arranged on the pressure plate. In the embodiment shown in FIGS. 21 to 25 the separator is arranged in the housing and the transporter is a flattened sleeve which is caused to rotate by the slider member and pulls away the uppermost picture of the pile which is then pushed by the slider member under the pile again, the pressure arrangement being disabled.

FIGS. 21 to 24 show in substantially schematic longitudinal section, the housing, slider member, pressure arrangement and the pile of pictures in their individual operational positions during the picture change, while FIG. 25 shows a plan view, half cut away, of a control plate for disabling the pressure arrangement as the slider member is being reinserted, which control plate lies close above the base of the housing.

The housing 201 has a viewing aperture or a window 213 which can be closed by a transparent plate. A slider member 207 may be pulled parallel to the window 213 out of the housing through an aperture 214 in the housing, the movement being limited by stops (not shown). A pile 215 of, for example, twenty pictures, is arranged beneath the window 213 with the picture side facing the window, and is pressed against the frame parts of the housing 201 that surround the window by a pressure arrangement 203 (FIG. 21). The narrow side of the housing 201, on the left in FIGS. 21–24, is closed by a lid 202 which may be snapped in or hinged and which, when removed, allows the pile 215 to be changed.

The pressure arrangement 203 comprises a pressure plate 216 supported by leaf springs 217 which are secured to the base 218 of the housing. The pressure plate has a bulge 208 or is arched to the same effect so that there is always a gap between the lower edge 219 of the pile facing the slider member and the underlying front edge 220 of the plate 216 into which gap a picture can be inserted (FIGS. 23 and 24).

A separator 206 is fixed in the housing. Above the separator the framework of the housing has an approximately rectangular chamber 221 in which a "bearing pin" 225 having an elliptical cross section is mounted in fixed position, the retentive element 223 being mounted on this bearing pin. The retentive element is a short length of tubing of layered construction of which the inner face facing the pin 225 may be coated with TEFLON, or polytetrafluoroethylene, which has a very low coefficient of friction against the rigid plastic material of which the pin is made, but of which the outer face, for example, as a result of a rubber coating, exhibits a very high static friction both to the picture support material and to the material of which the slider member consists.

The arrangement is so designed that the underside (or the lower "side") of the retentive element 223 facing the pile lies slightly lower down than the lower edge 212 of the frame surrounding the window 213 with which frame in turn the upper edge of the lateral bars 224 of the slider member 207 is flush.

The long axis of the ellipse is furthermore so long that as the retentive element rotates on the pin 225 the uppermost picture 211 is held on a part of its surface close to the slider member, and the long axis extends beyond the separator 206 so as also to convey the rear edge of the picture over this separator.

The slider member has a U-shaped outline with lateral arms 226 (FIG. 25) and a transverse arm 227 at the end face as well as lateral bars 224 projecting upwards from the lateral arms 226, and a front bar 227 which closes off the housing aperture at the front when the slider member is inserted. The slider member can be pulled out by the pull 229.

Arranged in the region of the base of the housing left clear by the U-shaped outline of the slider member are the springs 217, already mentioned, as well as a disabling mechanism. This consists of a rigid control plate 230 guided in guides 231 formed on the base 218 of the housing, of which the transverse member 232 in the rest position of the control plate (FIGS. 21 and 22) lies behind the leaf spring 217 that is closer to the housing aperture. Lateral projections 233 from the control plate are disposed in the path of movement of inwardly projecting abutments 234 formed on the lateral arms of the slider member.

The operation of the device is as follows:

In the closed position (FIG. 21) the uppermost picture 211 lies against the lower edge 212 of the window frame. It also lies against the underside of the retentive element 223 against which in turn—at the side of the pile of pictures 215—the lateral bars 224 lie. When the pull 229 is pulled to the right, the slider member rotates the retentive element as a result of the frictional contact, which element is pliant enough to remain clinging to the elliptical shape of the pin 225 so that the picture 211 is conveyed out at the speed of the slider member. The frictional contact between picture and transporter is assisted by the pressure arrangement 203. The separator acts as a stop for the remainder of the pile since the gap between separator and retentive element 223 allows only one picture to pass through (FIG. 22). In the outermost position of the slider member (FIG. 23) the transporter has moved the picture 211 right over the separator 206. Shortly before this the abutments 234 have met the projections 233 of the control plate and have pushed this to the housing aperture 214, the transverse member 232 of the control plate sliding onto the leaf spring 217 that is closer to the housing aperture and in so doing pressing this down. As a result of the resiliency of the leaf spring, the control plate remains clamped in this position. In the course of this the plate 216 is pulled down so far towards the base 218 of the housing that it is lower than the upper side of the lateral arms 226 of the slider member, on which arms the picture 211 then rests, so that this picture is safely pushed between the edge 220 and the pile edge 219 when the slider member is moved back. In the course of this the plate 216 also remains clamped down with the result that the retentive element 223 now driven by the slider member in the opposite direction of rotation, turns freely, without bearing against the now uppermost picture 211'. The return movement of the slider member is consequently unimpeded until the control plate is pushed back into its initial position by means of the inner side of the end arm 227 of the slider member 207 running onto it.

A further guide 235 is provided in the base 218 of the housing for a button 236 with which, even when the slider member is pushed in, the control plate can be shifted from the outside into the position disabling the pressure arrangement 203, the slider member being, of course, pushed out slightly; this button is operated before the lid 202 is opened so as to change the pile of pictures or, in any case, when the pictures are not to be changed but are to be stored or dispatched, so as to remove the pressure from them.

The following examples of embodiments are indicated only in principle in the drawings since the operations can be seen at a glance taking into consideration the detailed explanations above the comments given below on the individual constructions.

As shown in FIGS. 26a and 26b, the pressure arrangement consists of two doubly cranked wires 301 which are rotatably mounted in the housing base 302. In the closed position they are turned beyond upper dead center and in this position press the pile 303 upwards. When the separator 304 runs on—here the uppermost picture is held fast by a transporter (not shown) in the housing—it strikes against the pressure plate 305 which rests on the wires 301, after which the wires rotate through about 90° in a clockwise direction. At the end of the return movement the pressure plate is lifted up again by the slider member.

The embodiment of FIGS. 27a, 27b is similar. The wires 310 are in this case mounted so as to be pivotable about axes that are parallel to the direction in which the slider member is pulled out and are biassed inwards/outwards by a spring 312. The pressure plate 313 has a retentive covering so that the bottom-most picture of the pile 314 is held fast when the slider member slides out, the separator 315 on the slider member forcing apart the wires 310 against the spring force until the lower edge of the separator 315 is lower than the bottom-most picture of a pile 314 of maximum thickness. An extension 316 is attached to each wire beyond the end edge of the pile nearest the withdrawal end so that the wires are also still held spread apart when the separator has slid over the held picture by the extension 316 which then lies against the separator and the wires are held pressed down during the return movement also until they are released again from the separator. Here, the pressure arrangement in actual fact operates only when the uppermost picture of the pile is in the viewing position but during the withdrawal of the slider member the pressure arrangement is operative to hold fast the bottom-most picture which is held fixed between the pressure arrangement and the separator.

The following examples are explained only in outline.

FIGS. 28a, 28b: wedge cams 320 on the slider member base 322 cause the springs 324 of the pressure arrangement, which are secured centrally to the housing base, to exert a pressure on the pile 326 only when the slider member is inserted.

FIGS. 29a, 29b, 29c: two flat bows 330 lie close to the base 332 of the housing and each carry two rigid pressure strips 334. Lateral pressure springs 336 are put under pressure by the slider member only when this is close to its 'home' position and arch the bows 330 upwards, while the springs 336 are relaxed during the withdrawal and insertion of the slider member so that the bows lie flat.

FIGS. 30a, 30b: leaf springs 340 carry a one-piece pressure plate or separate cross-pieces 342. Close to the part of the springs near the base 341 a control member 344 similar to that mentioned above referring to FIGS. 21 to 25, can be pulled over both springs and thus press these down, so that the slider member, as in all examples, takes with it the pictures so that by appropriate stops it is possible to determine on which region of the path of the slider member the disabling is to take place. It is preferred to press down first of all one and only thereafter the other of two springs arranged one behind the other (in the direction of withdrawal) so that the movement of the slider member does not stiffen too suddenly.

FIGS. 31a, 31b, 31c: here, the springs 352 mounted in the housing base 350 so as to rotate about a vertical axis are rotated by a slider member-controlled rod system through a predetermined angle, the springs being held against the base by clips 354 fixed to the housing base over a greater or lesser part of their longitudinal extent and thereby disabled.

FIGS. 32a, 32b: wedge cams 360 controlled by the slider member press upwards beneath the middle sections of springs 362 as the slider member is pulled out, the springs being flexibly supported on both sides of this point in a retainer 364 on the housing. The ends of the springs 366 pivot downwards and are thus disabled. Only when the return movement of the slider is almost complete are the wedge cams 360 pushed out again.

FIGS. 33a, 33b: here, the pressure arrangement is arranged not in the housing but in the slider member. The springs 370 are initially hooked into the housing base by means of a hook 372 while the pressure plate 374 engages with lateral pins 376 in a guide grove 378 arranged laterally on the slider member. When the slider member is pulled, the pins slide first of all downwards along the guide groove and finally strike the base, a movement which can be used to unhook the end of the spring on the housing; however, alternatively, simple wedge cams on the slider member may be used for this purpose. When the slider member is reinserted, the reverse procedure takes place, i.e., the hook will catch in the slot in the housing base and the pins will slide from the base upwards along the guide groove.

FIGS. 34a, 34b: the pressure spring 380 secured centrally to the base of the slider member runs in the housing onto fixed wedge cams 382 and in so doing is biased into the pressure position.

The above explanations to FIGS. 26a–34b only reproduce in outline the means by which the pressure arrangement can be, for example, disabled.

It should be noted that the arrangement of the pressure elements on the slider member is only possible when the disabling according to the invention is provided.

It is to be noted further that it is the disabling of the pressure arrangement for reinsertion of the picture pile which permits dimensioning of the pressure arrangement bias powerful enough to keep the picture under the window flush therewith in spite of a bulky pile comprised of many pictures subjected to deformation due to, say, changes of ambient conditions. In result, the device may be used as a neat stand-up or hanging frame.

FIGS. 35–38 illustrate the use of the device as a stand-up frame. The pull 410 on the slider member and the viewing window 412 of the device can be seen. The device consists of injection-molded plastics parts, especially the housing 414 with the window 412. Whereas the narrow edges 416 run, generally, at right angles to the window face, the arm 418 has a shallow recess 420, the cross section of which may be seen in FIG. 35. According to this FIG., the base 422 of the recess is flat but not parallel to the narrow edge 416 and thus at right angles to the window face, but forms with the latter an angle A of less than 90°, for example of 80°.

Standing at right angles on this base 422 a pivoting pin 424 is shaped on the arm 418. The pin 424 has slots parallel to the axis and has a somewhat enlarged head 426 so that its profile in longitudinal section is approximately mushroom-shaped. At its free head end the pin is so cut away that it is flush with the remaining edge 416 of the arm 418.

A pivoting prop 430 is placed on the pin 424 and for this purpose has a bore 432 complementary to the profile of the pin. The supporting prop 430 also with the remainder of its shape fits exactly in the recess 420 with the exception of its limiting face 434 (FIG. 36) which forms an angle with the corresponding face 436 on the arm 418; this angle B is the largest angle through which the supporting prop can be pivoted out from the arm 418.

The outer edges 438 and 440 of the supporting prop are again flush with the rest of the arm 418.

Figure 37:
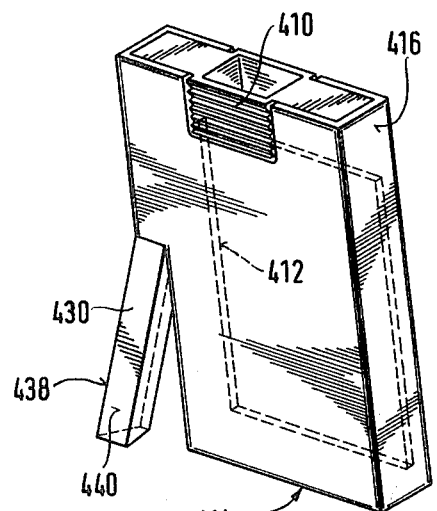
Figure 36:
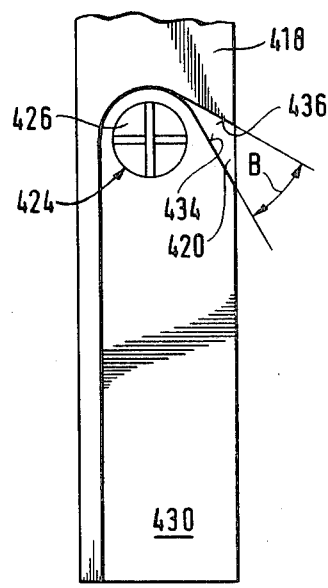

FIG. 37 shows the pivoted position of the supporting prop 430 when the device is set up on its lower edge opposite the pull 410. As it is pivoted outwards, the supporting prop does not remain in a plane perpendicular to the viewing window 412, but in a plane with the bottom 422 of the recess, so that its supporting face is approximately behind the stand-up edge of the device. This receives thereby a more secure standing position.

Figure 38:
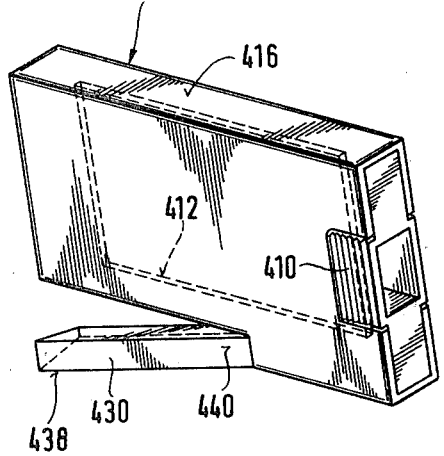

As shown in FIG. 38 this inclined position is also obtained when the device is set up on the arm 418. The line of contact between the supporting face of the supporting prop runs at an acute angle to the arm 418 so that the device is in a convenient viewing position but is securely supported.

It should be noted that the outward or inward pivoting movement may be additionally used to control certain operations of the change-over mechanism, for instance the permanent disabling of the pressure arrangement.

Between the housing and the slider member an auxiliary spring may be arranged which either restores the pulled-out slider member automatically or is compressed during the return movement so that the slider member is ejected, for instance by pressing a button.

The slider member may have, for instance near to its pull, elements which engage to couple up to a motor drive means which is provided, for example, in an episcope in which the device may then be inserted.

What is claimed is:

1. A picture viewer for a pile of pictures, comprising enclosure means including a frame defining a viewing window and a slider reciprocably mounted on the frame, the frame and slider having relative obverse and reverse sliding movements in opposite directions along the window, the enclosure means also defining a picture compartment having one end adjacent the window to contain a pile of pictures with a picture at one end disposed at said one end of the compartment and adjacent the window, a pressure means on the enclosure means and confronting the window at the compartment to press the pile of pictures against the viewing window, a picture changing mechanism adjacent the picture compartment for removing an individual picture from one end of the pile and returning the individual picture to the other end of the pile in response to such relative obverse and reverse movement of the frame and slider to present a new picture at the window for display, said picture changing mechanism including a pile transporter and an individual picture transporter, one of the transporters being connected with the frame and movable therewith and the other of the transporters being connected with the slider and movable therewith, the pile transporter being disposed at one side of the compartment to engage one side of the pile of pictures, the picture transporter being disposed at one end of the compartment to engage such an individual picture at the corresponding end of the pile of pictures, the transporters producing relative movement of the pile of pictures and of the individual picture during changing of the picture at the window, and a disabling device having functional connection with the pressure means and acting to alternately effect relief and application of pressure on the pile of pictures during operation of the picture changing mechanism to facilitate the change of pictures.

2. A picture viewer according to claim 1, and functional means maintaining the disabling device operational for relieving the pressure on the pictures in response to a significant portion of the relative sliding movement between the frame and slider.

3. A picture viewer according to claim 2 wherein the pressure means includes a pressure spring biased to resiliently urge the pressure means toward the window, and the disabling device having abutments movable into operational condition relative to the pressure means and against the tension of the pressure spring to draw the pressure means away from the window and relieve the pressure on the pictures.

4. A picture viewer according to claim 3, wherein the pressure means includes an assembly of pressure plates to engage the pictures, the assembly of plates having edge portions and central portions between said edge portions, said pressure springs being leaf springs acting against the central portion of the assembly of plates, and the slider having means engaging the assembly of plates during such relative sliding movement between frame and slider to tilt the assembly of plates in a rocking movement, and cam means on the enclosure means moving along and against the edge portion of the plate assembly in response to relative reverse sliding movement between frame and slider and said cam means drawing the pressure plates away from the window to relieve pressure on the pictures.

5. A picture viewer according to claim 4, and the individual picture transporter is a retentive element on the pressure means to confront and engage the face of the picture at the end of the pile, the pressure means being mounted on the frame and the cam means being on the slider, the edge portions of the plate assembly being disposed laterally of the retentive element.

6. A picture viewer according to claim 2, wherein the pressure means is spaced away from the window to relieve pressure on the pictures, and the disabling device having abutments movable into operative condition relative to the pressure means to move the pressure means toward the window and apply pressure on the pictures.

7. A picture viewer according to claim 6, wherein the pressure spring biases the pressure means away from the window, and the abutments of the disabling device moving into operative condition against the spring tension on the pressure means to apply pressure on the pictures.

8. A picture viewer according to claim 7, and the disabling device including means moving said abutments against the pressure means in response to relative reverse movement between the frame and slider to apply pressure on the pictures.

9. A picture viewer according to claim 6, wherein cam means include wedge-shaped abutments on the slider and camming onto and over edge portions of the plate assembly.

10. A picture viewer according to claim 2, and said pressure means being on the slider.

11. A picture viewer according to claim 2, wherein the frame and slider have relative obverse movements to picture changing position and have relative reverse movements to picture display position, said pressure means including leaf springs oriented obliquely of the relative sliding movement of frame and slider, the disabling device including a spring depressing plate engaging the leaf spring and operated by the picture changing mechanism to withdraw the spring away from the window, said depressing plate having means releasing the leaf spring in response to return of the frame and slider to picture displaying position to permit the spring to press the pile of pictures against the viewing window.

12. The picture viewer according to claim 11, wherein the slider has leading and trailing ends relative to the direction of relative sliding movement thereof, said leading and trailing ends having abutment cams thereon, and stop cams on the depressing plate and engaging said abutment cams to release the leaf spring at picture changing position of the frame and slider and to initiate withdrawal of the spring adjacent picture changing position.

13. A picture viewer according to claim 2, wherein the pressure means is on the frame and includes a pressure plate confronting the window and swinging levers connecting with the plate and frame on axes extending transversely of the direction of relative sliding movement of the frame and slider, said levers swinging to move the pressure plate toward and away from the window, the pile transporter being on the slider to swing the levers for moving the pressure plate away from the window in response to relative obverse sliding movement of frame and slider.

14. The picture viewer according to claim 2, wherein the pressure means includes a pressure plate confronting the window and a plurality of elongate spring bows mounted on the frame beneath the plate and pivotable about axes parallel to the direction of relative sliding movement of frame and slider for moving the pressure plate toward and away from the window, a spring engaging such spring bows and biasing the pressure plate toward the window, and said pile transporter being on the slider and having camming means to engage and depress said spring bows to draw the pressure plate away from the window in response to relative sliding movement between frame and slider.

15. The picture viewer according to claim 2, wherein the frame and slider have relative obverse sliding movement to picture changing position and relative reverse sliding movement to picture displaying position, the pressure means including bias springs to urge the pile of pictures toward the window, and additional enabling springs on the enclosure means and urging said bias springs toward the window in response to return of the frame and slider to picture displaying position.

16. The picture viewer according to claim 2, wherein the slider has grooves extending in the direction of relative sliding movement to form cam guides, and the disabling device including control cams connected with the pressure means and sliding in said cam guides.

17. The picture viewer according to claim 2, wherein the pressure means includes elongate leaf springs on the enclosure and pivotally mounted on axes extending perpendicular to the window, stationary slides adjacent to and overlying said leaf springs to draw the springs away from the window as the springs are pivoted about said axes, and the disabling device includes a linkage means rotating said leaf springs to disable the pressure means in response to relative sliding movement between frame and slider.

18. A picture viewer according to claim 1, and manual disabling means having a control element on the frame and operable to selectively permanently disable the pressure means to relieve pressure on the pictures.

19. A picture viewer for a pile of pictures, comprising enclosure means including a frame defining a viewing window and a slider reciprocably mounted on the frame, the frame and slider having relative obverse and reverse sliding movements in opposite directions along the window, the enclosure means also defining a picture compartment having one end adjacent the window to contain a pile of pictures with a picture at one end disposed at said one end of the compartment and adjacent the window, a pressure means on the frame and including a plate confronting the window at the compartment to press the pile of pictures against the viewing window, the pressure means including a pressure spring resiliently urging the plate toward the window, a picture changing mechanism adjacent the picture compartment for removing an individual picture from one end of the pile of pictures and returning the individual picture to the other end of the pile in response to the relative obverse and reverse movement of the frame and slider to present a new picture at the window for display, a disabling device acting on the pressure means to alternately effect relief and application of spring pressure on the pile of pictures in response to operation of the picture changing mechanism to facilitate removal and return of the individual picture to the pile, the disabling device including a cam on the slider and moving along and against cam following edge portions of the pressure plate for drawing the pressure plate away from the window to relieve the pressure on the picture, and an additional disabling control movably mounted on the frame and protruding to the exterior thereof and having connection to the pressure spring of the pressure means to move the pressure spring and plate away from the window of the frame.

20. The picture viewer according to claim 19, wherein the pressure spring is a leaf spring on the frame and lying generally obliquely of the window, and said disabling control being slidably mounted on the frame to simultaneously slide and draw the spring away from the window.

21. The picture viewer according to claim 20, wherein said disabling control is slidable on the frame between enabling position wherein the disabling control has minimal effect on the pressure means, and disabling position wherein the leaf spring is tensioned and drawn away from the window, there being a frictional clamping relation between the spring and disabling control in said disabling position of the control to hold the disabling control in said position, and a retrieval spring connected between the frame and disabling control to return the disabling control to enabling position.

* * * * *